(12) United States Patent
Suib et al.

(10) Patent No.: US 7,438,887 B2
(45) Date of Patent: Oct. 21, 2008

(54) MANGANESE OXIDE NANOWIRES, FILMS, AND MEMBRANES AND METHODS OF MAKING

(75) Inventors: Steven Lawrence Suib, Storrs, CT (US); Jikang Yuan, Storrs, CT (US)

(73) Assignee: The University of Connecticut, Farmington, CT (US)

( * ) Notice: Subject to any disclaimer, the term of this patent is extended or adjusted under 35 U.S.C. 154(b) by 410 days.

(21) Appl. No.: 11/220,340

(22) Filed: Sep. 6, 2005

(65) Prior Publication Data

US 2006/0049101 A1   Mar. 9, 2006

Related U.S. Application Data

(60) Provisional application No. 60/607,496, filed on Sep. 3, 2004.

(51) Int. Cl.
| | |
|---|---|
| C01G 45/02 | (2006.01) |
| B01D 39/14 | (2006.01) |
| B01D 69/02 | (2006.01) |
| B01D 53/22 | (2006.01) |
| B01D 69/10 | (2006.01) |
| B01D 59/12 | (2006.01) |
| B81B 1/00 | (2006.01) |
| B81B 3/00 | (2006.01) |
| C30B 29/16 | (2006.01) |
| C30B 29/68 | (2006.01) |
| B01J 23/34 | (2006.01) |
| B01J 29/78 | (2006.01) |
| B01J 35/04 | (2006.01) |

(52) U.S. Cl. ............. 423/605; 210/500.21; 210/500.25; 502/1; 502/4; 502/300; 502/524; 977/755; 977/811; 96/4; 96/11

(58) Field of Classification Search ................. 423/605; 210/500.12, 500.25; 977/755, 811; 502/1, 502/4, 300, 524; 96/4, 11
See application file for complete search history.

(56) References Cited

U.S. PATENT DOCUMENTS 4,927,768 A * 5/1990 Coughlin et al. ............ 436/172

(Continued)

FOREIGN PATENT DOCUMENTS

| CN | 1377832 | 1/2002 |
| EP | 0 623 556 A1 | 4/1993 |

OTHER PUBLICATIONS

Jia Liu et al., "Magnesium Manganese Oxide Nanoribbons: Synthesis, Characterization, and Catalytic Application"; J. Phys. Chem. B 2002, 106, 9761-9768.

(Continued)

*Primary Examiner*—Timothy C. Vanoy
*Assistant Examiner*—Serena L Hanor
(74) *Attorney, Agent, or Firm*—Cantor Colburn LLP

(57) ABSTRACT

Nanowires, films, and membranes comprising ordered porous manganese oxide-based octahedral molecular sieves, and methods of making, are disclosed. A single crystal ultralong nanowire includes an ordered porous manganese oxide-based octahedral molecular sieve, and has an average length greater than about 10 micrometers and an average diameter of about 5 nanometers to about 100 nanometers. A film comprises a microporous network comprising a plurality of single crystal nanowires in the form of a layer, wherein a plurality of layers is stacked on a surface of a substrate, wherein the nanowires of each layer are substantially axially aligned. A free standing membrane comprises a microporous network comprising a plurality of single crystal nanowires in the form of a layer, wherein a plurality of layers is aggregately stacked, and wherein the nanowires of each layer are substantially axially aligned.

17 Claims, 6 Drawing Sheets

U.S. PATENT DOCUMENTS

| | | | |
|---|---|---|---|
| 5,545,393 A * | 8/1996 | O'Young et al. | 423/605 |
| 5,597,944 A * | 1/1997 | O'Young et al. | 585/654 |
| 5,635,155 A * | 6/1997 | O'Young et al. | 423/599 |
| 6,248,674 B1 * | 6/2001 | Kamins et al. | 438/798 |
| 6,503,476 B1 * | 1/2003 | Suib et al. | 423/599 |
| 6,517,802 B1 | 2/2003 | Xiao et al. | 423/592 |
| 6,527,955 B1 * | 3/2003 | Sun | 210/500.22 |

OTHER PUBLICATIONS

Yubing Wang et al., "Nanoscale Energetics with Carbon Nanotubes", Materials Research Society Symposium Proceedings vol. 800, Dec. 1-4, 2003.

Written Opinion of the International Searching Authority for International Patent Application PCT/US2005/031915 filed Sep. 6, 2005.

* cited by examiner

MANGANESE OXIDE NANOWIRES, FILMS, AND MEMBRANES AND METHODS OF MAKING

CROSS REFERENCE TO RELATED APPLICATIONS

The present application relates to, and claims the benefit of, U.S. Provisional Patent Application No. 60/607,496, which was filed on Sep. 3, 2004 and is incorporated herein in its entirety.

STATEMENT REGARDING FEDERALLY SPONSORED RESEARCH

The U.S. Government has certain rights in this invention pursuant to Department of Energy Grant No. DE-FG02-86ER13662.A0000.

BACKGROUND

Inorganic materials that have unusual structures often exhibit interesting chemical and physical characteristics which find extensive applications in diverse fields. For example, inorganic molecular sieves are porous crystalline structures comprising a solid three-dimensional framework with interconnected internal cavities or pores. Applications for these materials include ion, molecule, and gas separations; molecule and gas sensing; ion-exchange; and catalysis, among others.

Ordered porous manganese-based octahedral molecular sieves (OMS) constitute an exemplary class of molecular sieves. These materials have one-dimensional tunnel structures and unlike zeolites, which have tetrahedrally coordinated species serving as the basic structural unit, these materials are based on six-coordinate manganese surrounded by an octahedral array of anions (e.g., oxide). The OMS framework architecture is dictated by the type of aggregation (e.g., corner-sharing, edge-sharing, or face-sharing) of the $MnO_6$ octahedra. The ability of manganese to adopt multiple oxidation states and of the $MnO_6$ octahedra to aggregate in different arrangements affords the formation of a large variety of OMS structures.

Many commercial applications have traditionally used molecular sieves in the form of granules or pellets. Recently, films or membranes of molecular sieves have gained considerable importance as alternatives to granules or pellets. However, suitable inorganic oxide-based materials are difficult to prepare as films or membranes owing to their brittleness and poor mechanical properties. A variety of molecular materials, mostly organic polymers, have been found to be suitable for use as membranes. However, organic polymer membranes have relatively short service lives because of their sensitivity to solvents and low stability at high temperatures.

There accordingly remains a need in the art for new methods of preparing inorganic oxide-based molecular sieve films or membranes because of their superior thermal and chemical properties to organic polymers. It would be particularly advantageous if such methods could eliminate or result in decreased brittleness. It would be further advantageous if such methods could result in increased mechanical properties for processing the films or membranes.

SUMMARY

A method for forming nanowires includes hydrothermally treating a chemical precursor composition in a hydrothermal treating solvent to form the nanowires, wherein the chemical precursor composition comprises a source of manganese cations and a source of counter cations, and wherein the nanowires comprise ordered porous manganese oxide-based octahedral molecular sieves.

A single crystal ultra-long nanowire comprises an ordered porous manganese oxide-based octahedral molecular sieve, wherein the single crystal ultra-long nanowire has an average length greater than about 10 micrometers and an average diameter of about 5 nanometers to about 100 nanometers.

A film includes a microporous network comprising a plurality of single crystal nanowires in the form of a layer, wherein a plurality of layers is stacked on a surface of a substrate, wherein the nanowires comprise ordered porous manganese oxide-based octahedral molecular sieves and have average lengths greater than about 10 micrometers and substantially uniform average diameters of about 5 nanometers to about 100 nanometers, and wherein the nanowires of each layer are substantially axially aligned.

A free standing membrane comprises a microporous network comprising a plurality of single crystal nanowires in the form of a layer, wherein a plurality of layers is aggregately stacked, wherein the nanowires comprise ordered porous manganese oxide-based octahedral molecular sieves and have average lengths greater than about 10 micrometers and substantially uniform average diameters of about 5 nanometers to about 100 nanometers, and wherein the nanowires of each layer are substantially axially aligned.

BRIEF DESCRIPTION OF THE DRAWINGS

Referring now to the Figures, which are exemplary embodiments, and wherein the like elements are numbered alike.

DETAILED DESCRIPTION

Figure 1:
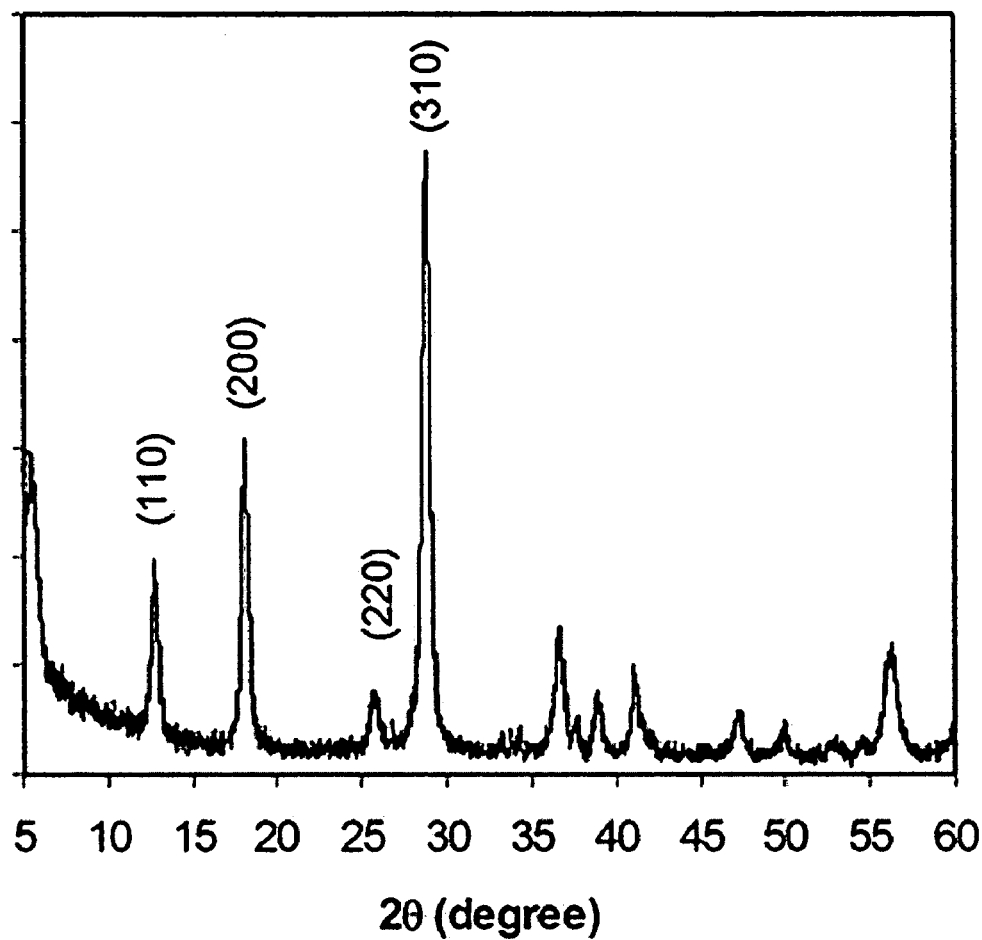
FIG. 1 is a powder X-ray diffraction pattern of a K—OMS-2 film.

Disclosed herein are methods for making nanowires, films, and membranes comprising ordered porous octahedral molecular sieves (OMS) based on manganese oxides. A method for making the nanowires generally comprises hydrothermally treating a chemical precursor composition to form the nanowires, wherein the chemical precursor composition comprises a source of manganese cations and a source of counter cations. A film generally may be formed from the nanowires by forming a suspension of the nanowires, and contacting the suspension with a substrate at a time and a temperature effective to self-assemble the film comprising the nanowires. A membrane generally may be formed by removing the substrate from the film. The nanowires, films, and membranes produced by the methods disclosed herein are advantageously less brittle and/or more mechanically robust than those made by methods of the prior art.

The term "nanowire" has its ordinary meaning as used herein, and generically describes a material that has a wire-like structure with an average diameter of about 1 to about 500 nanometers (nm) and an aspect ratio greater than about 10. As used herein, a "film" includes a combination of nanowires deposited on a surface of a substrate. The term "substrate" is used herein in its broadest sense, and includes materials having irregular shapes such as for example flakes, as well as regular shapes such as for example spheres, sheets, and films upon which the film may be produced. The term "self-assemble" as used herein refers to formation of a material (e.g., the film) without application of any external forces other than heat. As used herein, the terms "membrane" and "free standing membrane" (FSM) are meant to be used interchangeably and generically describe the film detached from the substrate.

Also as used herein, the terms "first," "second," and the like do not denote any order or importance, but rather are used to distinguish one element from another, and the terms "the", "a" and "an" do not denote a limitation of quantity, but rather denote the presence of at least one of the referenced item. Furthermore, all ranges reciting the same quantity or physical property are inclusive of the recited endpoints and independently combinable. The modifier "about" used in connection with a quantity is inclusive of the stated value and has the meaning dictated by the context or includes the degree of error associated with measurement of the particular quantity.

In one embodiment, the OMS materials produced by the methods disclosed herein are todorokites. Todorokites include materials wherein the $MnO_6$ octahedra share edges to form triple chains and the triple chains share corners with adjacent triple chains to form a 3×3 tunnel structure. The size of an average dimension of these tunnels is about 6.9 Angstroms (Å). A counter cation, for maintaining overall charge neutrality, such as Na, Ca, Mg, and the like is present in the tunnels and is coordinated to the oxides of the triple chains. Todorokites are generally represented by the formula $(M)Mn_3O_7$, wherein M represents the counter cation and manganese is present in at least one oxidation state. Further, the formula may also include waters of hydration and is generally represented by $(M)_yMn_3O_7 \cdot xH_2O$, where y is about 0.3 to about 0.5 and x is about 3 to about 4.5.

In one embodiment, the OMS materials produced by the methods disclosed herein are hollandites. Hollandites include a family of materials wherein the $MnO_6$ octahedra share edges to form double chains and the double chains share corners with adjacent double chains to form a 2×2 tunnel structure. The size of an average dimension of these tunnels is about 4.6 Å. A counter cation for maintaining overall charge neutrality such as Ba, K, Na, Pb, and the like, is present in the tunnels and is coordinated to the oxides of the double chains. The identity of the counter cation determines the mineral species or structure type. Hollandites are generally represented by the formula $(M)Mn_8O_{16}$, wherein M represents the counter cation and manganese is present in at least one oxidation state. Further, the formula may also include waters of hydration and is generally represented by $(M)_yMn_8O_{16} \cdot xH_2O$, where y is about 0.8 to about 1.5 and x is about 6 to about 10. Suitable hollandites include hollandite $(BaMn_8O_{16})$, cryptomelane $(KMn_8O_{16})$, manjiroite $(NaMn_8O_{16})$, coronadite $(PbMn_8O_{16})$, and the like, and variants of at least one of the foregoing hollandites. In one embodiment, the OMS materials produced are cryptomelane-type materials.

Hereinbelow, an OMS material with a 3×3 tunnel structure, such as in the todorokites, will be referred to by the designation "M-OMS-1", and an OMS material with a 2×2 tunnel structure, such as in the hollandites, will be referred to by the designation "M-OMS-2", wherein M represents the appropriate counter cation.

Suitable precursor compositions comprise a source of manganese cations and a source of counter cations. The source of manganese cations may be any inorganic or organic manganese-containing compound, provided that the compound does not substantially interfere with other components of the chemical precursor composition or the course of the reaction. Further, the manganese may be in any of its known oxidation states. Suitable compounds include manganese salts, including but not limited to those with an anion such as sulfate; persulfate; sulfide; nitrite; nitrate; phosphate; halide such as fluoride, chloride, bromide, and iodide; perchlorate; carbonate; acetate; alkoxide such as for example methoxide, ethoxide, propoxide; dichromate; formate; chromate; oxalate; acetate; and the like. Manganese salts containing a combination comprising at least one of the foregoing anions may be used, as well as combinations of different manganese salts. Hydrates of manganese salts may also be used, for example a hydrate of one of the foregoing salts, or a combination comprising a hydrate of at least one of the foregoing salts. Mixtures of hydrates and non-hydrates may also be used. In one embodiment, the source of manganese cations is manganese sulfate monohydrate.

The counter cations may be any alkali metal, alkaline earth metal, transition metal, rare earth metal, main group metal, or complex cation in a +1, +2, +3, and/or +4 oxidation state. Suitable counter cations include cations of H, Li, K, Rb, Cs, Ba, Mg, Ca, Pb, Co, Ni, Cu, Fe, V, Nb, Ta, Cr, Mo, Ag, W, Zr, Ti, Cd, Zn, Ln (wherein Ln is lanthanum or any of the lanthanides), or ammonium counter cations. The source of counter cations may be any inorganic or organic compound, provided that the compound does not substantially interfere with other components of the chemical precursor composition or the course of the reaction. Suitable compounds include manganese salts, including but not limited to those with an anion such as sulfate; persulfate; sulfide; nitrite; nitrate; phosphate; halide such as fluoride, chloride, bromide, and iodide; perchlorate; carbonate; acetate; alkoxide such as for example methoxide, ethoxide, propoxide; dichromate; formate; chromate; oxalate; acetate; and the like. Counter cation salts containing a combination comprising at least one of the foregoing anions may be used, as well as a combination of different counter cation salts. Hydrates of counter cation salts may also be used, for example a hydrate of one of the foregoing salts, or a combination comprising a hydrate of at least one of the foregoing salts. Mixtures of hydrates and non-hydrates may also be used. In one embodiment, the source of counter cations is potassium sulfate and potassium persulfate. In another embodiment, the source of counter cations is ammonium sulfate and ammonium persulfate. It is possible to use mixed salts, that is, salts that provide more than one type of counter cation, but generally, where more than one type of counter cation is desired in the nanowire, the precursor composition will comprise a separate source for each counter cation.

Optionally, the chemical precursor composition may further comprise a source of a framework substituting cation, wherein a framework substituting cation is a cation other than manganese present in the framework in place of a portion of the manganese. Similar to the manganese, the framework substituting cation may be present in the framework in more than one oxidation state. Suitable framework substituting cations include cations of H, Li, K, Rb, Cs, Ba, Mg, Ca, Pb, Co, Ni, Cu, Fe, V, Nb, Ta, Cr, Mo, Ag, W, Zr, Ti, Cd, Zn, or Ln. Desirably, the framework substituting cations are cations of Cu, Fe, Co, or Ni. The source of a framework substituting cation is present in an amount effective to introduce the desired proportions of the framework substituting cation into the framework of the OMS during the course of the reaction. The source of the framework substituting cation may be any inorganic or organic compound, provided that the compound does not substantially interfere with other components of the chemical precursor composition or the course of the reaction. Suitable compounds include framework substituting salts, including but not limited to those with an anion such as sulfate; persulfate; sulfide; nitrite; nitrate; phosphate; halide such as fluoride, chloride, bromide, and iodide; perchlorate; carbonate; alkoxide such as for example methoxide, ethoxide, propoxide; dichromate; formate; chromate; oxalate; acetate; and the like. Framework substituting salts containing a combination comprising at least one of the foregoing anions may be used, as well as a combination of different framework substituting salts. Hydrates of framework substituting salts may also be used, for example a hydrate of one of the foregoing salts, or a combination comprising a hydrate of at least one of the foregoing salts. Mixtures of hydrates and non-hydrates may also be used. It is possible to use mixed salts, that is, salts that provide more than one type of framework substituting cation, but generally, where more than one type of framework substituting cation is desired in the nanowire, the precursor composition will comprise a separate source for each framework substituting cation.

Hydrothermally treating the chemical precursor composition comprises heating the chemical precursor composition and a solvent in a sealed reaction vessel. The solvent used in the hydrothermal treating may comprise any aqueous or organic compound that is liquid at the reaction temperature, provided that the liquid does not substantially interfere with the course of the reaction. Suitable solvents include water, such as tap water, deionized water ($DI-H_2O$), distilled water, or deionized distilled water (DDW); acids, such as nitric acid, acetic acid, sulfuric acid, phosphoric acid, hydrofluoric acid, and the like; bases, such as hydroxides of Na, K, $NH_4$, and the like; alcohols; and the like and a combination comprising at least one of the foregoing solvents. In one embodiment, the hydrothermal treating solvent is DDW.

The reaction vessel may be of any size and composition that permits application and/or development of pressure, and further permits control of temperature and agitation of its contents. In one embodiment, the reaction vessel comprises interior facing walls formed of an inert material. The inert material is selected such that it is inert to the precursor composition and the solvent, and withstands the temperature and pressure of heating. In one embodiment the inert material is a fluorinated polymer. Suitable fluorinated polymers include tetrafluoroethylene (TFE), polytetrafluoroethylene (PTFE), fluoro(ethylene-propylene) (FEP), and the like.

The temperature, pressure, and time of the hydrothermal treatment affect nanowire growth rate as well as product formation and yield, and may vary depending on the desired size and product yield. Suitable conditions may be determined by one of ordinary skill in the art without undue experimentation using the guidelines provided herein. The heating temperature has a greater effect on nanowire crystallization, while the heating time has a greater effect on nanowire size. The crystallization rate increases with heating temperature and nanowire size increases with heating time. In one embodiment, the temperature of heating is about 150 to about 350 degrees Celsius (° C.). In another embodiment, the temperature of heating is about 200 to about 300° C. In yet another embodiment, the temperature of heating is about 225 to about 275° C. Pressures of about 1 to about 100 atmospheres (atm) are obtained. Typically, the time of the hydrothermal treatment is greater than about 12 hours and is dependent on the desired nanowire size. The heating time of the hydrothermal treatment may be greater than about 18 hours.

After the hydrothermal treatment, the nanowires may be isolated by removing the contents of the sealed reaction vessel, rinsing, and filtering.

In one advantageous feature, the nanowires produced by the method are single crystals and have substantially uniform diameters, wherein the variation in diameter is less than about 1%. In one embodiment, the average nanowire diameters are about 5 to about 100 nm. In another embodiment, the average nanowire diameters are about 10 to about 50 nm.

In another advantageous feature, the nanowires produced by the method are ultra-long nanowires. The ultra-long nanowires have average lengths of greater than about 10 micrometers. In another embodiment, the ultra-long nanowires have average lengths greater than about 100 micrometers. In yet another embodiment, the ultra-long nanowires have average lengths greater than about 500 micrometers. In yet another embodiment, the ultra-long nanowires have average lengths greater than about 1 millimeter (mm). In yet another embodiment, the ultra-long nanowires have average lengths greater than about 10 mm.

In another advantageous feature, the nanowires produced by the method have micropores, mesopores, and/or macropores. Further, the tensile strengths of the nanowires and the conductivity of the nanowires may be quite high.

In one embodiment, the nanowires are aggregated to form a rope comprising several strands of nanowires. In another embodiment, the nanowires may be shaped and/or wrapped around various objects.

In one embodiment, after the hydrothermal treatment, the isolated nanowires may be subjected to an optional ion exchange step, wherein a portion or all of the counter cations may be replaced with different counter cations. The ion exchange step may be any effective ion exchange step as known to those skilled in the art, for example a second hydrothermal treatment similar to that described above, a thermal treatment, a thermal oxidation treatment, or the like.

In one embodiment, a foreign material, for example a particle, may be embedded within a pore of a nanowire. The foreign material can be anything that is not integral to the framework of the nanowire. Suitable foreign materials include metals, alloys, organic molecules, polymers, enzymes, ceramics, glasses, and the like, and combinations comprising at least one of the foregoing materials.

To produce the film, a suspension is formed by placing the nanowires in a suspension solvent. The suspension solvent may comprise any aqueous or organic liquid that does not adversely affect the structure or properties of the nanowires. Suitable suspension solvents include, but are not limited to, water, such as tap water, $DI-H_2O$, distilled water, DDW; acids, such as nitric acid, acetic acid, sulfuric acid, phosphoric acid, hydrofluoric acid, and the like; bases, such as hydroxides of Na, K, $NH_4$, and the like; alcohols; and the like, and combinations comprising at least one of the foregoing solvents. The suspension solvent may or may not be the same as the hydrothermal treating solvent. In one embodiment, the suspension solvent is DDW.

Formation of the suspension may be facilitated by agitation. Agitation may be in the form of stirring or sonication. In another embodiment, the formation of the suspension may be facilitated through heating. Desirably, the suspension is substantially homogeneous.

The film is self-assembled by heating the suspension, without agitation, in the presence of the substrate. Suitable conditions for the time and temperature of self-assembly may be determined by one of ordinary skill in the art without undue experimentation using the guidelines provided herein. The temperature of self-assembly may be about 50 to about 150° C., specifically about 70 to about 100° C. The time of self-assembly is generally greater than about 6 hours, specifically greater than about 12 hours.

The substrate may be any solid material with a surface on which the film will self-assemble. Suitable substrates include metals, alloys, ceramics, glass, organic polymers, fluorinated polymers, quartz, sapphire, wood, paper, and the like. Suitable metals include transition group metals, rare earth metals including lanthanides and actinides, alkali metals, alkaline earth metals, main group metals, and combinations comprising at least one of the foregoing metals. Suitable fluorinated polymers include TFE, PTFE, FEP, and the like. In one specific embodiment, the substrate is PTFE.

The shape of the substrate does not appear to be critical. In one embodiment, the substrate is stamped with a pattern and the film adopts the pattern of the stamped substrate.

In one advantageous feature, more than one substrate may be used to self-assemble more than one film simultaneously.

While not wishing to be bound by theory, it is believed that the self-assembly of the nanowires on the substrate to form the film depends on factors such as substrate surface tension and convection, as well as nanowire-substrate surface and nanowire-nanowire interactions. The self-assembly process proceeds via convection of tangled nanowires from the bottom to the top of the vessel containing the substrate and the suspension. During evaporation of the suspension solvent, liquid is expelled from the suspension containing the nanowires and a clearer phase appears at the bottom of the vessel. The expulsion is believed to be driven by interfacial tension processes, which continue to reduce the surface area of the suspension to minimize its energy.

The removing of the substrate from the film to form the FSM may comprise peeling, cutting, or dissolving the substrate. After the FSM is formed, it may undergo annealing. A temperature for the annealing step is about 80 to about 200° C. for a duration greater than about one hour.

The film and the membrane comprise a microporous network of nanowires. A layer is formed from a plurality of nanowires that are substantially axially aligned and a plurality of layers is aggregately stacked. In one embodiment, the nanowires in each layer may be essentially parallel to each other. In another embodiment, the layers are stacked with a change in direction of nanowire orientation of about 90° at every layer. It is believed that the film, and the membrane, have three levels of structure: a primary structure with each fiber as a microporous structure (tunnels); a secondary mesoscopic assembly of long nanowires substantially axially aligned to form a layer; and a tertiary macroscopic structure, which results from the alignment and connectivity of the microporous network to form the membrane in the absence of external forces. The porosity leads to an enhancement of textural properties of the membrane. For example, the surface area of the membrane is about 10 to about 500 squared meters per gram ($m^2/g$).

It is believed that the thickness of the film, and of the membrane, may be controlled by the dimension of the substrate and by the concentration of the suspension. The average thickness of the film (not including the substrate), and of the membrane, may be about 1 micrometer to about 10 mm.

In one advantageous feature, the membrane produced by the method is robust, flexible, and resilient to bending. The membrane may be written on, folded and/or cut into various shapes while remaining intact. A room temperature tensile strength of the membrane is about 0.1 to about 10 megaPascals (MPa). Further, the membrane also maintains its malleability under cryogenic conditions.

In another advantageous feature, the membrane may be "recycled" and a new membrane may be formed by re-submerging the membrane into the second solvent and by simply repeating the film self-assembly process of forming a suspension and heating the suspension in the presence of the substrate.

In yet another advantageous feature, the film and/or the membrane may comprise embedded materials within the empty spaces of the aggregated nanowires. Suitable embedded materials include metals, alloys, organic molecules, polymers, catalysts, enzymes, ceramics, glasses, and the like, and a combination comprising at least one of the foregoing materials.

The nanowires, films and/or FSM are useful in a variety of applications including, but not limited to, ion, molecule, and gas separations; molecule and gas sensing; ion-exchanging; semiconductors; photocatalysis; heterogeneous catalysis; and lithium secondary battery cathodes among others.

The invention is further illustrated by the following non-limiting examples.

In these examples, characterization of products was carried out using several techniques. The phase of each product was identified by powder X-ray diffraction (PXRD) using a Scintag XDS-2000 diffractometer with CuK$\alpha$ radiation operating at 45 kV and 40 mA. The chemical composition was determined by inductively coupled plasma atomic emission spectroscopy (ICP) and thermogravimetric analysis (TGA). An average oxidation state (AOS) of manganese was determined by potentiometric titration methods. A room temperature conductivity was determined using four-probe techniques. A BET surface area was measured by $N_2$ desorption using a BJH model.

The cross-sectional area of film and membrane samples were studied by field emission scanning electron microscopy (FESEM) using a Zeiss DSM 982 Gemini microscope with a Schottky Emitter operated at 2 kV with a beam current of about 1 µA. Cross-sectional samples of the paper-like material were prepared by carefully cutting the material with a sharp knife. The sample was then deposited horizontally on carbon tape. A 45° stub holder was used for the study and the samples were tilted 45° towards the edge in order to bring the cross-sectional area of the sample to focus.

High-resolution transmission electron microscopy (HR-TEM) studies of the flat surface and cross-sectional area of membrane samples were carried out using a JEOL 2010 FasTEM at an accelerating voltage of 200 kV. A flat sample was prepared by cutting 3 mm segments of the sample and gluing it to a slotted cooper grid. The sample was then ion milled using a precision ion polishing system (PIPS). For the cross-sectional studies, the sample was supported between two silicon wafers and held in place with M-Bond adhesive (TEM grade). The "sandwich" was mechanically ground to a diameter of 2 mm and a thickness of about 0.75 mm. The sample was then placed inside a 3 mm (OD) brass tube and filled with Gatan G-1 Resin. The tube was subsequently sliced, ground, and thinned in the same way as the flat sample.

EXAMPLE 1

K—OMS-2

The chemical precursor compositions, 19.1 millimoles (mmol) of $K_2SO_4$, $K_2O_8S_2$, and $MnSO_4 \cdot H_2O$ in a 3:3:2 ratio, were dissolved in 80 milliliters (mL) DDW. The chemical precursor compositions and the solvent were transferred to a Teflon-lined stainless steel vessel. The vessel was sealed and placed in an oven and heated at 250° C. for 4 days to produce K—OMS-2 nanowires. The nanowires were suspended in 800 mL of DDW and stirred vigorously overnight, producing a stable wool-like homogeneous suspension. A dark brown K—OMS-2 film, as evidenced by the PXRD pattern of FIG. 1, was then produced by heating the suspension at 85° C. for 24 hours in the presence of a Teflon substrate.

Figure 2:
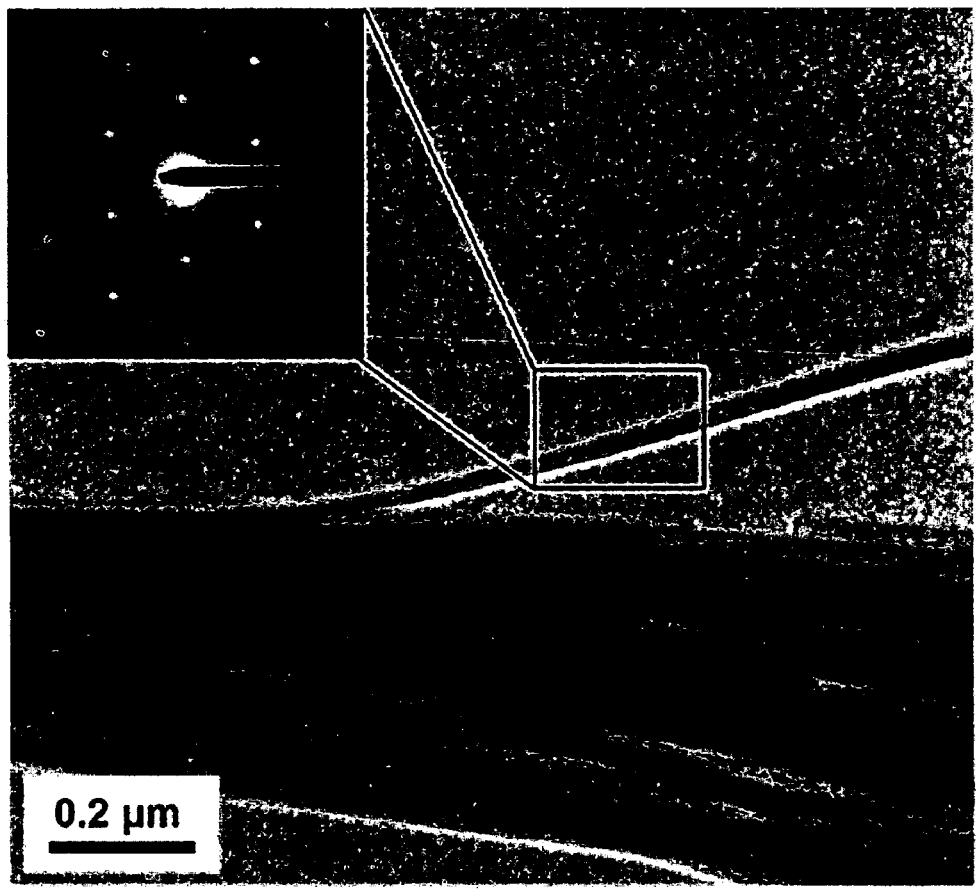
FIG. 2 is a transmission electron micrograph of a bundle of K—OMS-2 fibers with a selected area electron diffraction pattern of a single nanowire.

Scanning and transmission electron microscopy show that the FSM comprised long nanowires with uniform diameter of about 30 nm. Electron diffraction of individual nanowires, as seen in FIG. 2, demonstrates that the nanowires were single crystals. The composition of the K—OSM-2 FSM was $K_3Mn_{7.95}O_{16.20} \cdot 0.51H_2O$. The conductivity was about 0.53 Siemens/centimeter (S/cm) and is one order of magnitude better than that of bulk cryptomelane-like materials. The tensile strength was about 6 MPa and the surface area was about 39 $m^2/g$.

EXAMPLE 2

Stamped Substrate K—OMS-2

Figure 3:
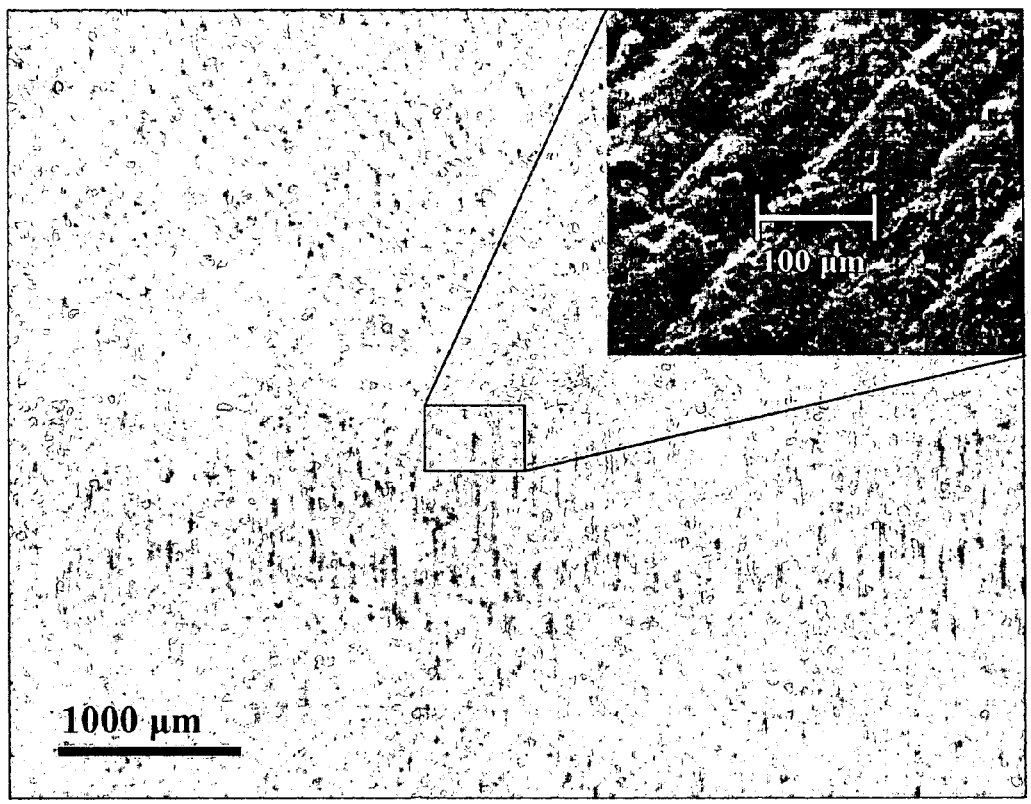
FIG. 3 is a scanning electron micrograph of a K—OMS-2 membrane grown on a patterned substrate.

A K—OSM-2 FSM was prepared according to Example 1, except that a stamped substrate was used. As shown in FIG. 3, the FSM adopted the pattern of the stamped substrate.

EXAMPLE 3

$NH_4$—OSM-2

An $NH_4$—OSM-2 was prepared according to Example 1, except the $K_2SO_4$ and $K_2O_8S_2$ were substituted with $(NH_4)_2SO_4$ and $(NH_4)_2O_8S_2$. The diameter of the $NH_4$—OSM-2 nanowires was about 30 nm. Electron diffraction of individual nanowires also demonstrates that the nanowires were single crystals. The conductivity was about 0.22 S/cm, the tensile strength was about 0.25 MPa, and the surface area was about 36 $m^2/g$.

EXAMPLE 4

Hydrothermal Ion Exchange of $NH_4$—OSM-2

$NH_4$—OSM-2 nanowires were synthesized according to Example 3. 5 samples of $NH_4$—OSM-2 nanowires were mixed with LiOH, NaOH, KOH, RbOH, and CsOH in DDW and placed in separate Teflon-lined stainless steel vessel. Each vessel was sealed and placed in an oven and heated at 250° C. for 4 days to produce OMS-2 nanowires where the $NH_4^+$ counter cation was replaced by $Li^+$, $Na^+$, $K^+$, $Rb^+$, and $Cs^+$, respectively.

Electron microscopy indicated that the overall lengths of the nanowires had decreased about 30% upon undergoing the ion exchange step. In one example, the conductivity of Li—OMS-2 was about 0.01 S/cm.

EXAMPLE 5

Thermal Ion Exchange and Oxidation of $NH_4$—OSM-2

$NH_4$—OSM-2 nanowires were synthesized according to Example 3. A sample of $NH_4$—OSM-2 nanowires was added to a mixture of concentrated $HNO_3$ and $H_2SO_4$ under reflux at 90° C. for 2 hours. The product was then rinsed with DI—$H_2O$. The $NH_4^+$ ions were partially replaced by $H^+$ ions. Upon heating in an oven at 75° C. for 12-24 hours, however, fully exchanged H—OMS-2 nanowires were formed. The conductivity of H—OMS-2 was determined to be about 0.02 S/cm.

EXAMPLE 6

Recycled K—OMS-2 Membrane

K—OMS-2 FSM was prepared according to Example 1. The FSM was placed in DI—$H_2O$, or a 1 M solution of $LiNO_3$, and stirred vigorously for 4 hours to produce a stable homogeneous suspension. Another dark brown K—OMS-2 film was produced by re-heating the suspension at 85° C. for 24 hours in the presence of a Teflon substrate.

The properties of the recycled K—OMS-2 remained substantially the same as in Example 1.

EXAMPLE 7

Embedded Nanoparticles in K—OMS-2 FSM

K—OMS-2 nanowires were synthesized according to Example 1. Samples of suspensions of Au nanoparticles, Pt nanoparticles, carbon nanotubes, and Sn—Sb—Pb—Hg nano-alloys, were individually added along with the nanowires to DDW and stirred vigorously overnight, producing a homogeneous suspension. The suspensions were heated at 85° C. for 24 hours in the presence of a PTFE substrate to produce embedded nanoparticles-K—OMS-2 FSM.

Figure 4:
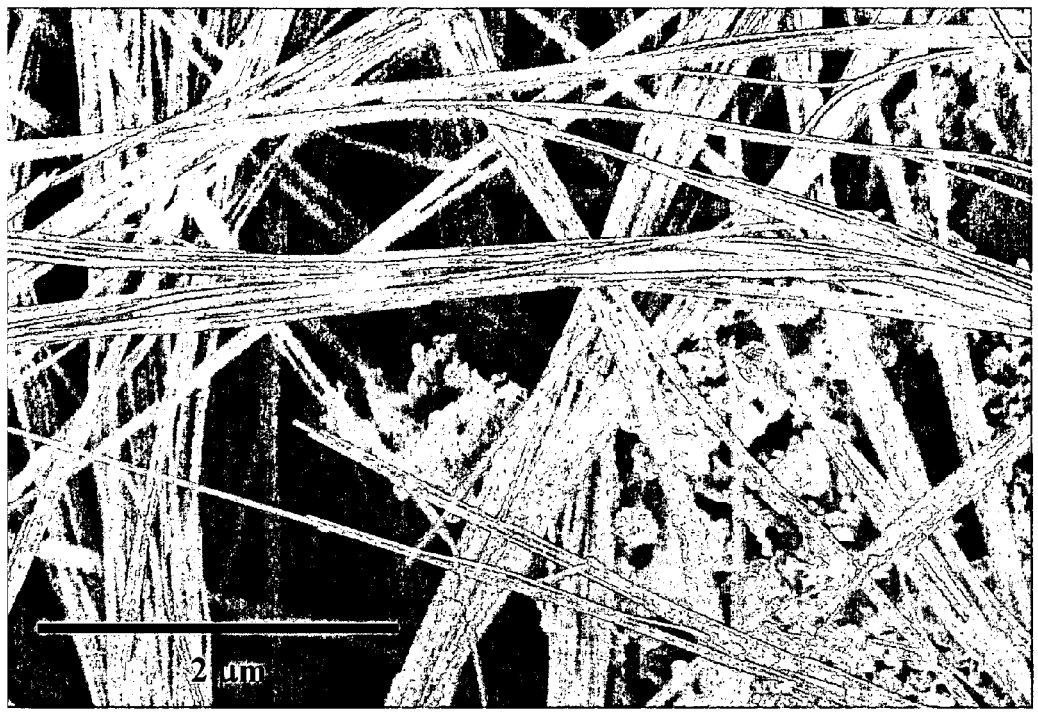
FIG. 4 is a scanning electron micrograph of a K—OMS-2 membrane with Au-nanoparticles embedded within the empty spaces of the aggregated nanowires, shown at 20000 times magnification.
Figure 5:
FIG. 5 is a scanning electron micrograph of a K—OMS-2 membrane with carbon nanotubes embedded within the empty spaces of the aggregated nanowires, shown at 50000 times magnification.
Figure 6:
FIG. 6 is a scanning electron micrograph of a K—OMS-2 membrane with Sn—Sb—Pb—Hg nano-alloy particles embedded within the empty spaces of the aggregated nanowires, shown at 50000 times magnification.

FIGS. 4-6 show K—OMS-2 FSM with Au-nanoparticles, carbon nanotubes, and Sn—Sb—Pb—Hg nano-alloy particles, respectively, embedded within the empty spaces of the aggregated nanowires.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A film, comprising a microporous network comprising a plurality of single crystal nanowires in the form of a layer, wherein a plurality of layers is stacked on a surface of a substrate, wherein the nanowires comprise ordered porous manganese oxide-based octahedral molecular sieves and have average lengths greater than about 10 micrometers and substantially uniform average diameters of about 5 nanometers to about 100 nanometers, and wherein the nanowires of each layer are substantially axially aligned.

2. The film of claim 1, further comprising a change in a direction of a nanowire orientation of about 90° between each layer of the plurality of layers.

3. The film of claim 1, wherein a counter cation of the ordered porous manganese oxide-based octahedral, molecular sieves comprises a cation of H, Li, K, Rb, Cs, Ba, Mg, Ca, Pb, Co, Ni, Cu, Fe, V, Nb, Ta, Cr, Mo, Ag, W, Zr, Ti, Cd, Zn, Ln, ammonium, or a combination comprising at least one of the foregoing cations.

4. The film of claim 1, further comprising a framework substituting cation, wherein the framework substituting cation of the ordered porous manganese oxide-based octahedral molecular sieves comprises a cation of H, Li, K, Rb, Cs, Ba, Mg. Ca, Pb, Co, Ni, Cu, Fe, V, Nb, Ta, Cr, Mo, Ag, W, Zr, Ti, Cd, Zn, Ln, or a combination comprising at least one of the foregoing cations.

5. The film of claim 1, wherein the substrate is stamped with a pattern and the film adopts the pattern of the stamped substrate.

6. The film of claim 1, wherein an average thickness of the film, not including the substrate, is about 1 micrometer to about 1.0 millimeters.

7. The film of claim 1, wherein a surface area of the film is about 10 squared meters per gram to about 500 squared meters per gram.

8. The film of claim 1, further comprising a metal, alloy, organic molecule, polymer, catalyst, enzyme, ceramic, glass, or a combination comprising at least one of the foregoing, embedded within an empty space of the microporous network.

9. A free standing membrane, comprising a microporous network comprising a plurality of single crystal nanowires in the form of a layer, wherein a plurality of layers is aggregately stacked, wherein the nanowires comprise ordered porous manganese oxide-based octahedral molecular sieves and have average lengths greater than about 10 micrometers and substantially uniform average diameters of about 5 nanometers to about 100 nanometers, and wherein the nanowires of each layer are substantially axially aligned.

10. The free standing membrane of claim 9, further comprising a change in direction of a nanowire orientation of about 90° between each layer of the plurality of layers.

11. The free standing membrane of claim 9, wherein a counter cation of the ordered porous manganese oxide-based octahedral molecular sieves comprises a cation of H, Li, K, Rb, Cs, Ba, Mg, Ca, Pb, Co, Ni, Cu, Fe, V,Nb, Ta, Cr, Mo, Ag, W, Zr, Ti, Cd, Zn, Ln, ammonium, or a combination comprising at least one of the foregoing cations.

12. The free standing membrane of claim 9, further comprising a framework substituting cation, wherein the framework substituting cation of the ordered porous manganese oxide-based octahedral molecular sieves comprises a cation of H, Li, K, Rb, Cs, Ba, Mg, Ca, Pb, Co, Ni, Cu, Fe, V, Nb, Ta, Cr, Mo, Ag, W, Zr, Ti, Cd, Zn, Ln, or a combination comprising at least one of the foregoing cations.

13. The free standing membrane of claim 9, wherein an average thickness of the free standing membrane is about 1 micrometer to about 10 millimeters.

14. The free standing membrane of claim 9, wherein a surface area of the free standing membrane is about 10 squared meters per gram to about 500 squared meters per gram.

15. The free standing membrane of claim 9, further comprising a metal, alloy, organic molecule, polymer, catalyst, enzyme, ceramic, glass, or a combination comprising at least one of the foregoing, embedded within an empty space of the microporous network.

16. The free standing membrane of claim 9, wherein a tensile strength of the free standing membrane is about 0.1 megaPascals to about 10 megaPascals.

17. The free standing membrane of claim 9, wherein the free standing membrane may be patterned, written on, folded, cut into a shape, or a combination comprising at least one of the foregoing, while remaining essentially intact.

* * * * *